United States Patent
Spasojevic et al.

(10) Patent No.: US 9,953,063 B2
(45) Date of Patent: Apr. 24, 2018

(54) SYSTEM AND METHOD OF PROVIDING A CONTENT DISCOVERY PLATFORM FOR OPTIMIZING SOCIAL NETWORK ENGAGEMENTS

(71) Applicant: Lithium Technologies, LLC, San Francisco, CA (US)

(72) Inventors: Nemanja Spasojevic, San Francisco, CA (US); Adithya Shricharan Srinivasa Rao, San Francisco, CA (US); Prantik Bhattacharyya, Union City, CA (US)

(73) Assignee: Lithium Technologies, LLC, San Francisco, CA (US)

( * ) Notice: Subject to any disclaimer, the term of this patent is extended or adjusted under 35 U.S.C. 154(b) by 80 days.

(21) Appl. No.: 14/702,696

(22) Filed: May 2, 2015

(65) Prior Publication Data

US 2016/0321261 A1  Nov. 3, 2016

(51) Int. Cl.
 *G06F 15/16* (2006.01)
 *G06F 17/30* (2006.01)
 *G06N 5/02* (2006.01)
 *G06Q 50/00* (2012.01)

(52) U.S. Cl.
 CPC .... *G06F 17/3053* (2013.01); *G06F 17/30867* (2013.01); *G06F 17/30887* (2013.01); *G06N 5/02* (2013.01); *G06Q 50/01* (2013.01)

(58) Field of Classification Search
 CPC ........... G06F 17/3053; G06F 17/30887; G06C 50/01; G06N 5/02
 See application file for complete search history.

(56) References Cited

U.S. PATENT DOCUMENTS

| | | | |
|---|---|---|---|
| 6,385,611 B1 * | 5/2002 | Cardona | G06F 17/3043 |
| 7,725,492 B2 | 5/2010 | Sitting et al. | |
| 7,756,926 B2 | 7/2010 | Tseng et al. | |
| 8,171,128 B2 | 5/2012 | Zuckerberg et al. | |
| 8,225,376 B2 | 7/2012 | Zuckerberg et al. | |
| 8,321,300 B1 | 11/2012 | Bockius et al. | |
| 8,606,792 B1 | 12/2013 | Jackson et al. | |
| 9,338,186 B2 | 5/2016 | Wollenstein et al. | |
| 2007/0083536 A1 | 4/2007 | Darnell et al. | |
| 2008/0033776 A1 | 2/2008 | Marchese | |
| 2008/0034058 A1 | 2/2008 | Korman et al. | |

(Continued)

OTHER PUBLICATIONS

Nemanja Spasojevic. Jinyun Yan, Adithya Rao, Prantik Bhattacharyya, "LASTA: Large Scale Topic Assignment on Multiple Social Networks," Aug. 24-27, 2014, pp. 1809-1818.

(Continued)

*Primary Examiner* — John B Walsh
(74) *Attorney, Agent, or Firm* — Neal Marcus

(57) ABSTRACT

A method is disclosed of providing a providing a content discovery platform for optimizing social network engagements. The method is implemented in one or more servers programmed to execute the method. The method comprising retrieving social media data from registered users on one or more social networks, wherein the social media data includes one or more URLs associated with one or more articles, respectively, computing a social importance score for each URL of the one or more URLs, and ranking the one or more URLs by social importance score.

18 Claims, 9 Drawing Sheets

(56) References Cited

U.S. PATENT DOCUMENTS

| | | |
|---|---|---|
| 2008/0040673 A1 | 2/2008 | Zuckerberg et al. |
| 2009/0132311 A1 | 5/2009 | Klinger et al. |
| 2009/0157667 A1 | 6/2009 | Brougher et al. |
| 2009/0181649 A1 | 7/2009 | Bull et al. |
| 2009/0249451 A1 | 10/2009 | Su et al. |
| 2011/0004922 A1 | 1/2011 | Bono et al. |
| 2011/0289574 A1 | 11/2011 | Hull et al. |
| 2012/0117059 A1 | 5/2012 | Bailey et al. |
| 2013/0018957 A1 | 1/2013 | Parnaby et al. |
| 2013/0291058 A1 | 10/2013 | Wollenstein et al. |
| 2013/0298038 A1* | 11/2013 | Spivack ............... H04L 65/403 715/753 |
| 2013/0318156 A1 | 11/2013 | Friedman et al. |
| 2014/0040377 A1 | 2/2014 | Friedman et al. |
| 2014/0074844 A1* | 3/2014 | Subramanian ......... G06Q 10/10 707/739 |
| 2014/0222834 A1* | 8/2014 | Parikh ............... G06F 17/30719 707/748 |
| 2014/0358911 A1* | 12/2014 | McCarthy ......... G06F 17/30864 707/723 |
| 2015/0112918 A1 | 4/2015 | Zheng et al. |
| 2015/0310018 A1* | 10/2015 | Fan ..................... G06F 17/30 707/734 |
| 2016/0203221 A1 | 7/2016 | Rao et al. |
| 2016/0203523 A1 | 7/2016 | Spacojevic et al. |

OTHER PUBLICATIONS

U.S. Non-Final Office Action dated Aug. 15, 2014 for U.S. Appl. No. 13/871,076, filed Apr. 26, 2013.
U.S. Final Office Action dated Apr. 8, 2015 for U.S. Appl. No. 13/871,076, filed Apr. 26, 2013.
U.S. Non-Final Office Action dated Nov. 3, 2015 for U.S. Appl. No. 13/900,878, filed May 23, 2013.
U.S. Final Office Action dated Mar. 30, 2016 for U.S. Appl. No. 13/900,878, filed May 23, 2013.
U.S. Non-Final Office Action dated Jul. 11, 2016 for U.S. Appl. No. 14/035,166, filed Sep. 24, 2013.
U.S. Final Office Action dated Oct. 4, 2017 for U.S. Appl. No. 14/627,151, filed Feb. 20, 2015.
U.S. Final Office Action dated Oct. 26, 2017 for U.S. Appl. No. 13/900,878, filed May 23, 2013.
U.S. Non-Final Office Action dated May 23, 2017 for U.S. Appl. No. 14/035,166, filed Sep. 24, 2013.
U.S. Final Office Action dated Sep. 21, 2016 for U.S. Appl. No. 14/035,166, filed Sep. 24, 2013.
Non-Final Office Action dated Dec. 28, 2017 for U.S. Appl. No. 14/852,965, filed Sep. 14, 2015.

* cited by examiner

DIRECTLY DERIVED FIELDS:
- DOCUMENT URL
- AUTHOR
- TITLE
- DESCRIPTION
- ARTICLE TEXT
- PUBLICATION TIME
- PROCESSING TIME
- AUTHOR SOCIAL IDENTITY
- AUTHOR DISPLAY NAME
- CATEGORIES
- IMAGE(S) (URL+SIZE+SCORE)
- VIDEO(S) (URL+SIZE+SCORE)

INDIRECTLY DERIVED FIELDS:
- KEYWORDS (WITH STRENGTH)
- TOPICS (WITH STRENGTH)
- LANGUAGE
- PUBLISHER INFORMATION

FIG. 5

SYSTEM AND METHOD OF PROVIDING A CONTENT DISCOVERY PLATFORM FOR OPTIMIZING SOCIAL NETWORK ENGAGEMENTS

FIELD OF THE INVENTION

The present invention relates to a system and method of providing a content discovery platform for optimizing social network engagements.

BACKGROUND OF THE INVENTION

Social networks have become an integral part of peoples' lives. Millions of people use social networks every day to communicate about a variety of topics, publish opinions and share information. Marketing experts have long recognized that an effective marketing strategy must include a presence on social networks. For example, many corporate users, particularly those that sell consumer products, communicate through Twitter as well corporate pages on LinkedIn and Facebook to reach social network users (their audience). It has been found, however, that social network presence alone is not adequate to maintain and more importantly, increase brand awareness, company influence, number of followers and ultimately sales of products or services. A user must actively engage and create a relationship with social network users (i.e., user's audience) directly in order to be effective. User engagement may include tweeting and retweeting and posting articles and comments on various topics for social network users (i.e., user's audience). High social media influence (called influencers) is desired but difficult to achieve because content relevant to the topics associated with the user (and of interest to the user's audience) is difficult to identify with current methods and systems.

It would be therefore advantageous to provide methods and systems to improve upon the current methods and systems.

SUMMARY OF THE INVENTION

Embodiments of a system and method are disclosed of providing a content discovery platform for optimizing social network engagements (i.e., interactions from a user's audience on social networks).

In accordance with an embodiment of this disclosure, a method is disclosed of providing a content discovery platform for optimizing social network engagements, the method is implemented in one or more servers programmed to execute the method, the method comprising: retrieving social media data from registered users on one or more social networks, wherein the social media data includes one or more URLs associated with one or more articles, respectively, computing a social importance score for each URL of the one or more URLs, and ranking the one or more URLs by social importance score.

In accordance with another embodiment in this disclosure, a computer-implemented system is disclosed for providing a content discovery platform for optimizing social network engagements, the system comprising a data storage area to store: a social media database, wherein social media data pertaining to data on one or more social networks associated with registered users is stored in the social media database; one or more servers coupled to the data storage area, wherein the one or more servers are programmed to execute computer program modules, the computer program modules comprising a first module for discovering one or more URLs from social media data on the one or more social networks, wherein the one or more URLs are associated with one or more articles, and a second module for summarizing each article of the one or more articles associated with a URL and for calculating one or more scores for one or more aspects of the one or more articles summarized to determine relevancy of the one or more aspects of the one or more articles.

In yet another embodiment of the disclosure, a computer-implemented system is disclosed for providing a providing a content discovery platform for optimizing social network engagements, the system comprising a data storage area to store: a social media database, wherein social media data pertaining to data on social networks associated with registered users is stored in the social media database; one or more servers coupled to the data storage area, wherein the one or more servers are programmed to execute computer program steps, the computer program steps comprising discovering one or more URLs from social media data stored on the social media database, wherein the one or more URLs are associated with one or more articles, generating a plurality of models each comprising a set of weights that are associated with engagements of the one or more URLs, calculating one or more scores for one or more aspects of the one or more articles to determine the relevancy of the one or more aspects of one or more articles associated with the one or more URLs, generating one or more features as a function of the one or more aspects of the one or more articles, and applying a model selected from the plurality of models to each feature to calculate a score of the relevancy of each of the one or more URLs.

In yet another embodiment of this disclosure, a computer-implemented system is disclosed for providing a content discovery platform for optimizing social network engagements, the system comprising a data storage area to store: a social media database, wherein social media data pertaining to data on social networks associated with registered users is stored in the social media database, one or more servers coupled to the data storage area, wherein the one or more servers are programmed to execute computer program steps, the computer program steps comprising discovering one or more URLs from social media data stored on the social media database, wherein the one or more URLs are associated with one or more articles, generating a query document relating to the user, wherein the query document includes topic frequencies and/or, keyword frequencies of the one or more articles; generating a summarization document summarizing each article of the one or more articles associated with the one or more URLs, wherein the summarization document includes one or more scores relating to relevancy of the one or more aspects of the one or more articles, respectively, and generating a plurality of features as a function of the query document and summarization document to capture aspects of the one or more articles to determine the relevancy of the one or more articles to a user.

BRIEF DESCRIPTION OF THE DRAWINGS

FIG. 5 depicts an example block diagram illustrating the fields of extraction for a summarization document.

DETAILED DESCRIPTION OF THE INVENTION

Figure 1:
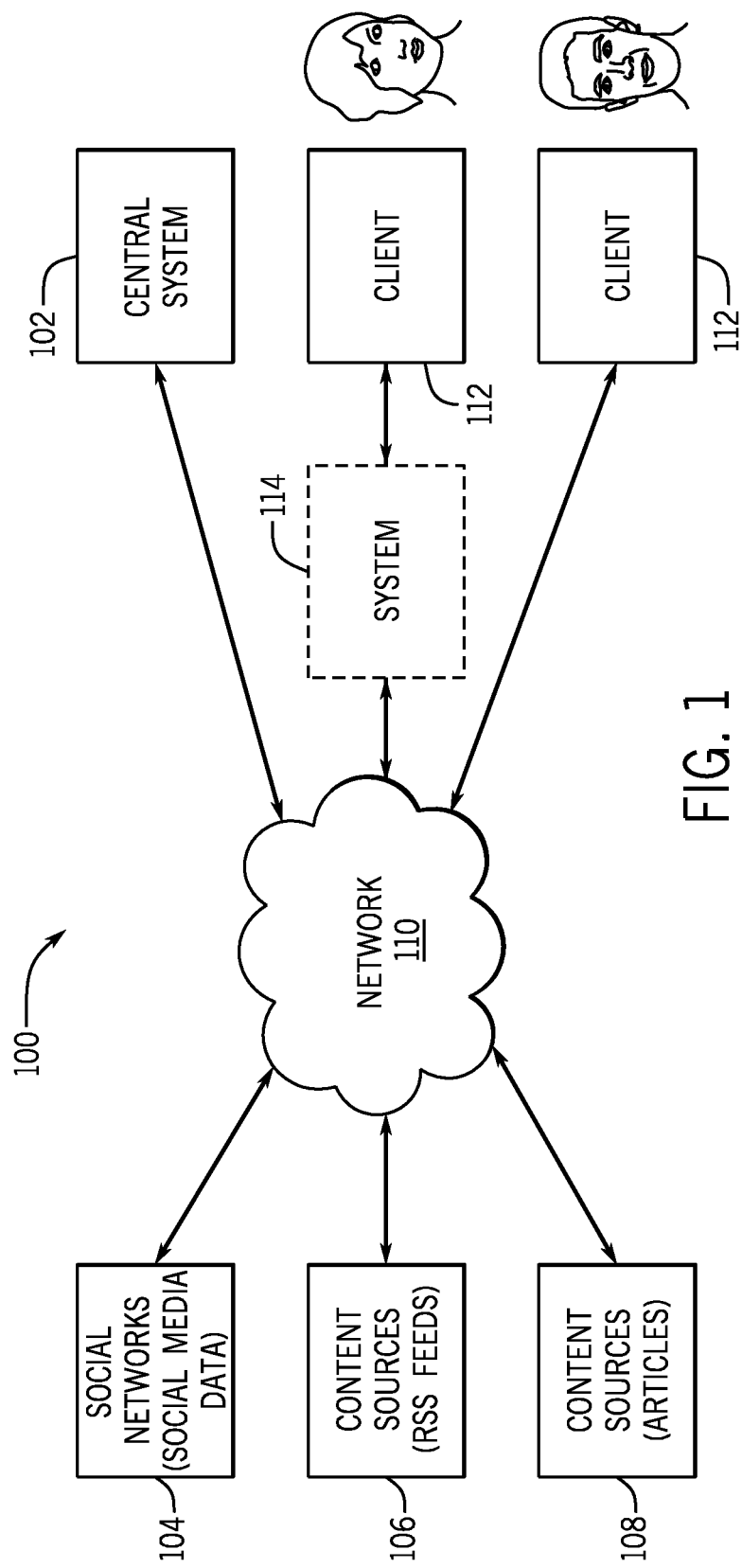
FIG. 1 depicts a block diagram illustrating an example system in which a content discovery platform for optimizing social network engagements operates.

Embodiments of the present disclosure are described herein with reference to the drawing figures.

FIG. 1 depicts a block diagram illustrating an example system 100 in which a content discovery platform for optimizing social network engagements (i.e., interactions from a user's audience on social networks) operates.

In this embodiment, system 100 includes a central system 102 that communicates with social networks 104, and content sources 106, 108 via network 110. Network 110 is the Internet, but it may be other communication networks such as a local area network (LAN) or both the Internet and LAN as known to those skilled in the art. System 100 also includes one or more clients 112 that enable users to communicate with social networks 104, content sources 106, 108 and central system 102 via network 110 by cable, ISDN, WIFI or wireless carrier networks as known to those skilled in the art. (Data and information are used interchangeably in this disclosure unless otherwise noted.)

Central system 102 incorporates content discovery platform 200 (described below) for optimizing social network engagements (i.e., interactions with a user's audience on social networks 104). Central system 102 includes one or more servers that may be connected together through a network such as a local area network (LAN) as known to those skilled in the art. The one or more servers may include a web server as known to those skilled in the art. Each server includes several internal components (e.g., processor, memory, drives, etc.), databases, operating system, software modules and applications (e.g., browser) as known to those skilled in the art. An example server is described below with respect to FIG. 9.

Social networks 104, as known to those skilled in the art, are typically web-based systems that allow users to create a profile, post content, connect to other users, engage with content and create a list of users with whom to share such content (e.g., social media data). The content may be photos, videos, articles or any other information and/or links linking to such content. Social networks 104 typically provide a means for users to interact over the Internet such as email and/or instant messaging. Examples of social networks 104 include LinkedIn, Twitter, Facebook, Google+, Instagram, Pinterest and Tumblr (to name a few). These web-based systems include one or more servers that may include a web server. Each server includes several internal components (e.g., processor, memory, drives, etc.), databases, operating system, software modules and applications (e.g., browser) as known to those skilled in the art. An example server is described below with respect to FIG. 9.

Content sources 106 is a system of one or more servers that comprise any number of news or other sources of information that provide RSS feeds to enable users to access such information. Examples of content sources include ABC, Bloomberg, Business Insider, Fast Company (to name a few). Each of theses sources provide RSS feeds to enable users to access information on its platform typically done by newsreaders. Content sources 108 is also a system of one or more servers that comprise any number of events, articles, PDFs, videos, photos or other (together "articles") that users may access via a URL (uniform resource identifier) posted on social networks 104 that link to such articles as known to those skilled in the art. The one or more servers may include a web server as known to those skilled in the art. Each server includes several internal components (e.g., processor, memory, drives, etc.), operating system, databases, software modules and applications (e.g., browser) as known to those skilled in the art. An example server is described below with respect to FIG. 9.

Each client 112 includes a personal computer and a monitor. The personal computer includes several internal components (e.g., processor, memory, drives, etc.), operating system, databases, software modules and applications (e.g., browser) as known to those skilled in the art. Clients 112, however, could be smartphones, cellular telephones, tablets, PDAs, or other devices equipped with industry standard (e.g., HTML, HTTP etc.) browsers or any other application having wired (e.g., Ethernet) or wireless access (e.g., cellular, Bluetooth, IEEE 802.11b etc.) via networking (e.g., TCP/IP) to nearby and/or remote computers, peripherals, and appliances, etc. TCP/IP (transfer control protocol/Internet protocol) is the most common means of communication today between clients or between clients and central system 102 or other systems (i.e., one or more servers), each client having an internal TCP/IP/hardware protocol stack, where the "hardware" portion of the protocol stack could be Ethernet, Token Ring, Bluetooth, IEEE 802.IIb, or whatever software protocol is needed to facilitate the transfer of IP packets over a local area network. Each client 112 may access the Internet directly or through a system 114 (shown in dotted lines) of one or more servers that communicates with Internet as known to those skilled in the art. These users may be an independent person, a representative of a corporate or government entity or any other person accessing information from central system 102, social networks 106, and/or content sources 106, 108.

Figure 2:
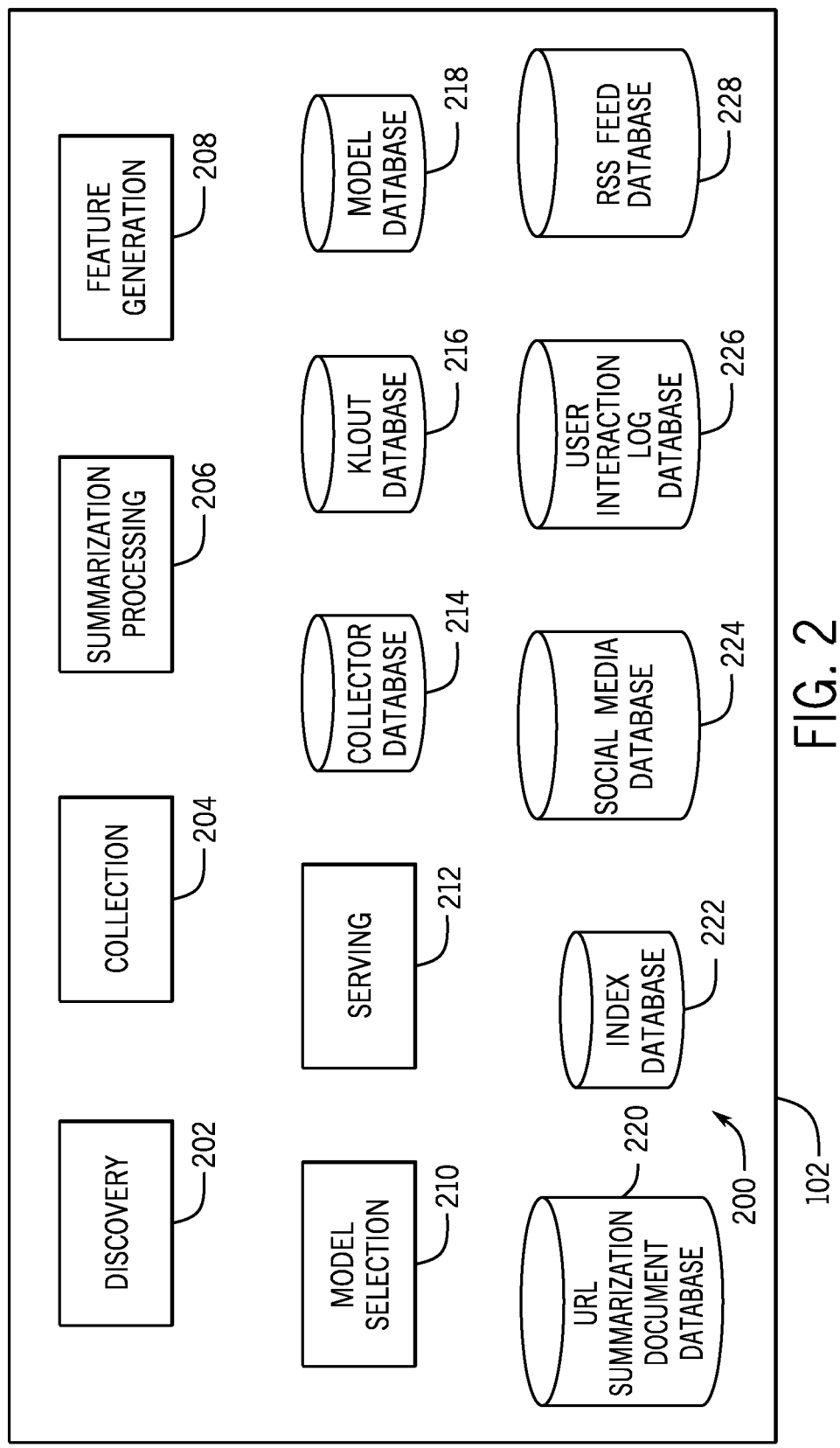
FIG. 2 depicts an enlarged block diagram of the system in FIG. 1 wherein several software modules and databases are shown.

As shown in FIG. 2, central system 102 incorporates content discovery platform 200 for optimizing content discovery through social networks 104. In brief, content discovery platform 200 is a framework that enables a user to discover high quality web content collected from various sources that is most relevant to a set of topics associated with the user. Content discovery platform 200 relies on users connections on social networks 104 to understand, among other things, topics of interest and expertise related to cohorts of users and other demographics information. Content discovery platform 200 then performs content discovery, collection and ranking on URLs and RSS feeds using extraction and machine learned scoring models.

In a bit more detail, content discovery platform 200 collects social media data, RSS feeds and articles, creates URL summarization documents from the collected data, creates features for capturing different aspect of an article's relevance using machine learning and trains models on subsets of articles to determine the weights for each feature.

Models may be trained with different objectives. For example, the models may be trained to optimize for different social network user interactions such as favorites, likes, clicks, user shares, audience reactions etc. Content discovery platform 200 then scores the URL summarization documents (URLs) using the trained models and the top articles are retrieved in order of score (rank) and presented to the user. The user determines the actual number of articles presented. Content discovery platform 200 is described in more detail below.

Content discovery platform 200 comprises one or more software applications, modules, computer instruction set and/or databases including (1), discovery and collection modules 202, 204, (2) summarization processing module 206, (3) relevant scoring feature 208, (4) model selection engine 210 and serving module 212. Content discovery platform 200 further includes collector database 214, Klout database 216 and model database 218. These modules/databases are described in detail below.

Discovery and collection modules 202, 204 are the software applications or modules (or set of computer instructions) that provide the infrastructure to discover and collect highly relevant content from sources such as social media (e.g., Twitter streams), RSS feeds and news articles. Discovery and collection modules 202, 204 select URL content from recent historical social media sharing. The collected content typically includes millions of articles per day. A URL list is generated by considering the number of shares, number of reactions and Klout score of people that shared the URL within an arbitrary time frame (15 minutes in near real time to 1 day in batch processing case). Only the most important URLs are fetched—the ones that were shared by highly influential people or the ones that created a lot of buzz. RSS content sources are selected by a combination of automated inference of social curation and manual curation. Specifically, an RSS list is a combination of a manually curated list of sources and automatically generated list based on URLs fetched in the past. The automatically generated list extracts RSS source links from (meta tags of 'application/rss+xml' that is embedded in) the HTML page. In this way, most links can be associated with the RSS feed from which they originated. This combined with the measure of original HTML page (content of URL) popularity within social networks allows content discovery platform 200 to generate an RSS feed scored list, where score is good predictor of how popular the links within RSS feed will be. (Stated differently, discovery of URL sources is based on a scoring system that incorporates the relevance and popularity of the articles at the current time.)

Summarization processing module 206 is the software application or module (or set of computer instructions) that summarizes the collected URLs (articles) and other related data into documents of normalized format using a combination of multiple text analysis techniques. Specifically, summarization is a process of parsing HTML pages to extract information of interest (fields) on the page. Keywords and topics, for example, are derived for each article based on text classification and natural language processing (NLP) analysis.

Feature generation module 208 is the software application or module (or set of computer instructions) that extracts features from a summarization document relating to an article including collection statistics (e.g., projected trends), timeliness, publisher of the article (e.g., authors expertise), and users interacting on social networks 104 with the article (e.g., number of shares). Feature generation module 208 leverages Klout data from topical and overall reputation. (As known by those skilled in the art, Klout data is derived using a tool for measuring social influence as known to those skilled in the art. For a given social network user, Klout data includes a Klout score, per network score, topical interest scores, topical expertise scores, keyword interest scores and keyword expertise scores.) The relevance of articles to topics is determined by applying a pre-determined model to these extracted features. The applied model is created offline using past actions of users. The score documents are ranked and retrieved based on their relevance. This is described below.

Model selection module 210 is the software application or module (or set of computer instructions) that enables a user or admin to select different relevance modules to be applied to a set of generated features for calculating ranking values for URLs. Module 210 also allows flexibility in terms of multivariate testing of subsets of extracted features or rules to be applied while presenting articles to users. This framework is used to experiment and gather data points for improving relevance machine learned models, in order to produce an optimized content for users.

Serving module 212 is the software application or module (or set of computer instructions) that provides multiple serving infrastructures. It may include a batch pipeline that performs feature generation (above) and relevance scoring of URLs in bulk. Serving module 212 also may use Elasticsearch where summarized documents are indexed and surfaced with low latency. Serving module 212 is also involved in serving (presenting) the top URLs to a user.

Collector database 214 is a database, that stores collectors used to collect social media data from social networks 104. Klout database 216 is a database that stores Klout data generated using the Klout social influence tool described above. Model database 218 is a database that stores models that are used to incorporate the importance of features (described below) and calculates a score based on those features. URL summarization database 220 is a database that stores URL summarization documents (described below). Index database 222 is a database that stores an index of URL summarization documents. Social media database 224 is a database that stores social media data collected from social networks 104 as described in this disclosure. User interaction log database 226 is a database of a log of user interactions. RSS feed database 228 is a database of RSS feeds. Databases 214-228 are databases known to those skilled in the art. However, those skilled in the art know that any data storage or strategy other than a database be used for storing the data disclosed in this disclosure. In addition, some databases may be available publicly via an application interface (API) (e.g., Klout database).

Execution proceeds to step 310 wherein summarization documents for the ranked URLs are generated using summarization processing module 206. At this step, HTML pages are content parsed to extract information of interest on the pages. Direct and indirect fields of extraction are shown in FIG. 5. Specifically, certain fields are extracted directly such as title, description, article text, publication time, processing time, author information etc. Other fields are directly derived from the web page but require additional processing to extract the best match. These fields include (1) publication timestamp, through parsing timestamps associate with the web page and (2) image URLs ranked by the image quality estimated from the byte content. Indirectly derived fields include the language of the article, keywords of the topics extracted using proprietary text analysis techniques (e.g., parsing HTML, term frequency-inverse document frequency (TF-IDF) weighted bag of words, or the keyword extraction techniques disclosed in U.S. application Ser. No. 14/627,151, filed Feb. 20, 2015, entitled "Domain Generic Large Scale Topic Expertise and Interest Mining Across Multiple Online Social Networks," which is incorporated by reference herein), and blacklisted domain identification matched against a list of blacklisted domains. An example of a summarization document appears in the rear of this disclosure.

Figure 3:
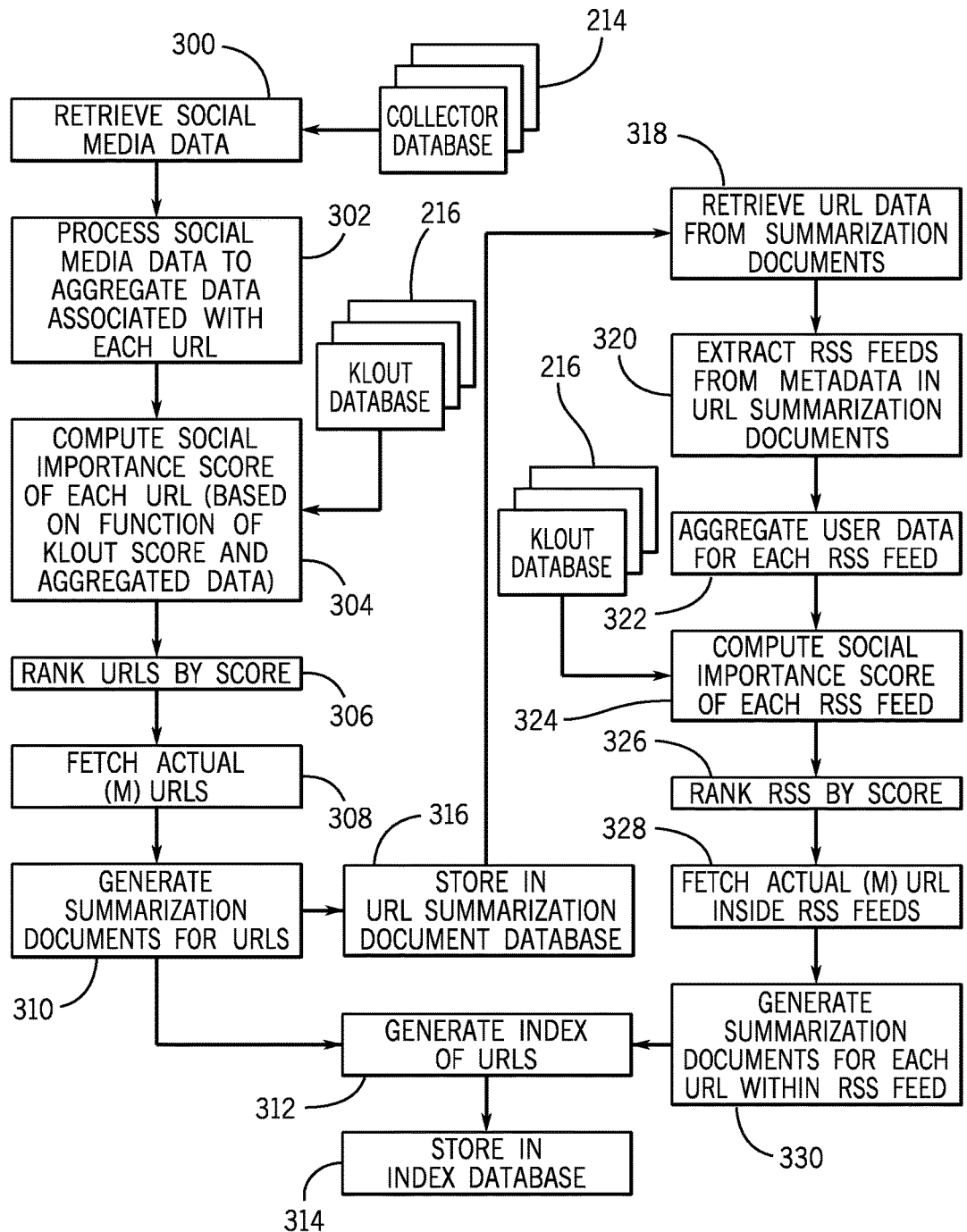
FIG. 3 depicts example method steps for implementing the discovery collection, and summarization modules shown in FIG. 2.

FIG. 3 depicts example method steps for implementing the discovery, collection, and summarization modules shown in FIG. 2.

In particular, execution begins at step 300 wherein social media data is collected by collection module 204 using a set of collectors from collector database 214. The data collected is stored in social media database 224. The social media data includes all data from registered users on social networks 104. For example, the data will include all Twitter public data (via GNIP or other streams). The data will also include comments and posts including URLs and all data on other social networks 104 (e.g., Facebook, Google-+, LinkedIn) including any other data that relates to those URLs (for all "connected" registered users). Connected users may be a friend or other connections or followers on social networks 104 that has some connected to the data (content) as known to those skilled in the art. For example, the data will include a specific user (author of post), actor (person that engaged), action (like, favorite, tweet, comment, share), message and URL. The data is typically collected from about 300 million users a month, but different amounts may be collected at different intervals as known to those skilled in the art.

Execution proceeds to step 302 wherein the social media data is processed to aggregate the data associated with each URL. Specifically, the data is aggregated by the number of users, actors and actions with respect to the URL as follows:

Example URL=({user}, {actor}, {action} . . . )
(The URL being a set of interactions.)

Aggregation on a URL may be accomplished using Hive or another third party tool known to those skilled in the art.

Execution proceeds to step 304 wherein a social importance score is computed for each URL as a function of a Klout score as identified by a Klout ID for a user and aggregated data. Social importance score is an estimate of engagement (i.e., interaction of a user's audience) of an article on social networks. Specially, the social important score (F) computed as follows:

$$F^{URL}(url) = \sum_{i|t \in T, url} w(e) * (\alpha * g(k^u) + \beta * g(k^a))$$

where the parameters identified above are defined as follows:

Interaction tuple: $i=(t, url, u, k^u, a, k^a, e)$
i: interaction tuple
t: timestamp of when interaction occurred
url: URL around which interaction occurred
u: user that created original post on social network (e.g., @ubunto)
$k^u$: Klout information of user u k=(score, topics, keywords, demographic_info). As shown above, this includes Klout score, demographic information, and various topical/keywords sets derived for a user and stored in Klout (knowledge) database 216.
a: actor or user (e.g., @santori follower of @smith) that 'acted' on original post via social network event e (like, comment, re-tweet, . . . etc.)
$k^a$: Klout information of actor "a" (score, . . . etc.)
e: event type of interaction (like, comment, favorite, re-tweet, . . . etc.)
$T=[t_{start}, t_{end}]$: time window in which a given URL is scored.
α: original user importance weight (scalar)
β: actor importance weight (scalar)
w: event weighting function to allow different events to be weighted differently (Twitter comment vs. Facebook comment etc. . . . )
g: user weighting function. Given user's information, and in particular, Klout information, weight of given user can be derived. (The user can have different importance.)

(The social importance score is to weight different interaction events with different values.) An example of one possible simplified formula can be:

$$F^{URL}(url) = \sum_{i|t \in T, url} 1.0 * (0.1 * k^a \cdot score + 0.9 * k^u \cdot score)$$

where g(k)=k·score and k·score is the Klout score. In the computation of social importance score, an alternative for a Klout score is may be used for determining the weight value g(k). For example, an equal (constant) weight value may be assigned for every user (i.e., same influence). For example, g(k)=1.0 (weight value of 1), then URL scoring function becomes a frequency count of a URL across social networks 104.

Execution then proceeds to step 306 wherein the URLs are ranked (sort) by the social importance score. At step 308, a designated number (M) of the top URLs by ranked score are fetched (collected). (M) may be selected as an number as known to those skilled in the art, but system requirements/constraints as well as diminishing returns may factor into the value for (M). For example, 300,000 URLs may be selected, but as indicated, any number may be selected as known to those skilled in the art. These fetched URLs are collected and queued in a distributed manner for efficient processing.

Execution proceeds to step 310 wherein summarization documents for the ranked URLs are generated using summarization processing module 206. At this step, HTML pages are content parsed to extract information of interest on the pages. Direct and indirect fields of extraction are shown in FIG. 5. Specifically, certain fields are extracted directly such as title, description, article text, publication time, processing time, author information etc. Other fields are directly derived from the web page but require additional processing to extract the best match. These fields include (1) publication timestamp, through parsing timestamps associate with the web page and (2) image URLs ranked by the image quality estimated from the byte content. Indirectly derived fields include the language of the article, keywords of the topics extracted using proprietary text analysis techniques (e.g., parsing HTML, term frequency-inverse document frequency (TF-IDF) weighted bag of words, or the keyword extraction techniques disclosed in U.S. application Ser. No. 14/627,151, filed Feb. 20, 2015, entitled "Domain Generic Large Scale Topic Expertise and Interest Mining Across Multiple Online Social Networks," which is incorporated by reference here), and blacklisted domain identification matched against a list of blacklisted domains. An example of a summarization document appears in the rear of this disclosure.

As part of the summarization processing, certain properties are derived from the articles that relates to aspects or characteristics of the articles to enable subsequent processing by the feature generation module 208 (as described below). Specifically, relevant scoring is performed to score (generate values for) certain aspects or characteristics of the articles to assess the relevancy of such aspects. The properties or scores are set forth in each summarization document for these aspects. The aspects or characteristics of relevance that are considered during scoring are (1) topic and keyword relevant to the user, (2) the publisher diversity, (3) timeliness of the articles, and (4) social signals (trending). This is described below.

(1) Topic and Keyword Relevance to the User.

Topics and keywords are first extracted for each article using text analysis (TF-IDF, Named Entity Extraction, or Dictionary Based Phrase Extraction) known to those skilled in the art. Keywords are mapped to topics by simple one to many mapping using manually curated list, or mappings derived using machine learning techniques like Naïve Bayes. This step analyzes text from the title, description, meta text, article text, topics and keywords assigned to the author of the article and topics and keywords assigned to users who shared the article. Topic and keywords derived from the above are assigned a score that signifies how closely the article is related to the topic or keyword. The keywords and topics are derived using a keyword dictionary and topic ontology, respectively. This score may be derived from techniques such as term frequency, inverse document frequency etc. as known to those skilled in the art. Topic and keyword derivation and scoring may be accomplished by the techniques disclosed in U.S. application Ser. No. 14/627,151, filed Feb. 20, 2015, entitled "Domain Generic Large Scale Topic Expertise and Interest Mining Across Multiple Online Social Networks," which is incorporated by reference herein. Different topic and keyword sets may be applied to the user for whom articles are fetched. Some user sets include topics and keywords of user's interested, topics and keywords of the user's expertise, topics and keywords of interest to the user's audience (per social network, or combined), self selected topics and keywords and trending topics and keywords. For a given topic and keyword set chosen for a user, the articles which have a high score for the topics and keywords are ranked and retrieved.

(2) Publisher Diversity.

Publisher diversity: for the same topic, articles from a wide variety of publishers and sources are extracted and surfaced (presented) to the user. Publishers are ranked by the quality of the articles published, which is determined by the number of shares and reactions that articles from the publisher receive. Features (as described below) are created to represent the publisher rank for each article, and articles with higher publisher ranks are given higher preference.

Topic and Keyword diversity: A topic or keyword set for a user typically contains multiple topics and keywords for which articles must be extracted and surfaced. However, the number of articles for popular topics such as sports, politics and entertainment are typically a lot larger than those for niche topics such as skydiving and quantum physics. In order to ensure that in the final list of articles all topics are fairly represented, the features (as described below), and thereby scores, associated with the articles are normalized within the scope of each topic. This makes the scores comparable across topics, and creates topic diversity when the retrieved article list is ranked by scores.

(3) Timeliness.

Article Recency: A publication timestamp of an article is derived for subsequent use. Features (described below) are created to capture the recency of content, which are derived from that publication timestamp. Articles that are more recent are given a higher weight than older articles, since fresh content provides greater relevancy to the user compared to older content.

Topical Time Decay Factors: articles are created with differing frequencies for different topics. For example, a topic such as music may have thousands of articles generated daily, whereas a topic such as spearfishing may have only one article created per week. In such a situation, considering only the publication timestamp will lead to the suppression of niche topics by the wider topics. Therefore, the time-relevance of topics should be taken into account while scoring articles. Accordingly, topical decay factors are used for articles on a given topic. A decay factor is applied to each article based on its topical lifetime (measure how quickly new articles are being generated). This is done via the following steps:

1. Calculate half life for each topic, where the decaying quantity is the number of posts per topic. The mean post lifetime:

$$meanPostLifetime \sim = \text{average time between posts} \quad (2)$$
$$\text{(in seconds)}$$
$$= n \text{ days/total posts created}$$
$$\text{for topic in } n \text{ days}$$

$$tHalf \text{ (topic)} = meanPostLifetime * \ln$$

2. Calculate age of the article, as the difference between current time and the publication time, in seconds.

3. Combine topic half life with URL age to get the decay factor for the URL, where the decaying quantity is content timeliness:

$$tau = \text{mean lifetime of topical content} = tHalf \text{ (topic)}$$
$$deltaT = \text{age\_of\_article}$$
$$\text{decay factor} = scalingFactor * \exp(-deltaT/tau)$$
$$= scalingFactor * \exp(-\text{age\_of\_article/topic\_half\_life})$$

Other similar features could be derived penalizing the frequency of posts within topical domain, for example using linear function rather than exponential.

This decay factor is larger for articles on topics that have higher publishing rates, and is smaller for those with lower rates. This ensures that topics are fairly represented with respect to time-relevance to the user.

(4) Social Signals.

Predicted Trends: if a certain subject begins to receive attention on social media, then it is likely that the subject will be of interest to the user. This is similar to the concept of breaking news, with the number of times an article is shared in social media approximating the attention the subject receives. Time series data is generated for articles shared on social media, where each data point represents the number of shares in a given time window. Polynomial ($y=a0+a1*x+a2*x^2+ \ldots$) or Logarithmic ($y=c+\log(x)$) curve-fitting or is applied to this time series. The extrapolated curve is used to forecast the shares the article is going to receive in the near future. Features generated (described below) to forecast predicted trends are used at scoring time, and articles that are forecasted to receive more attention are prioritized over others. Features generated from predicted forecast function may be number of expected shares per unit of time $$\left(e.g. \frac{dy}{dt}\right),$$

or expected share per unit of time growth $$\left(e.g. \frac{d^2y}{d^2t}\right).$$

Figure 6:
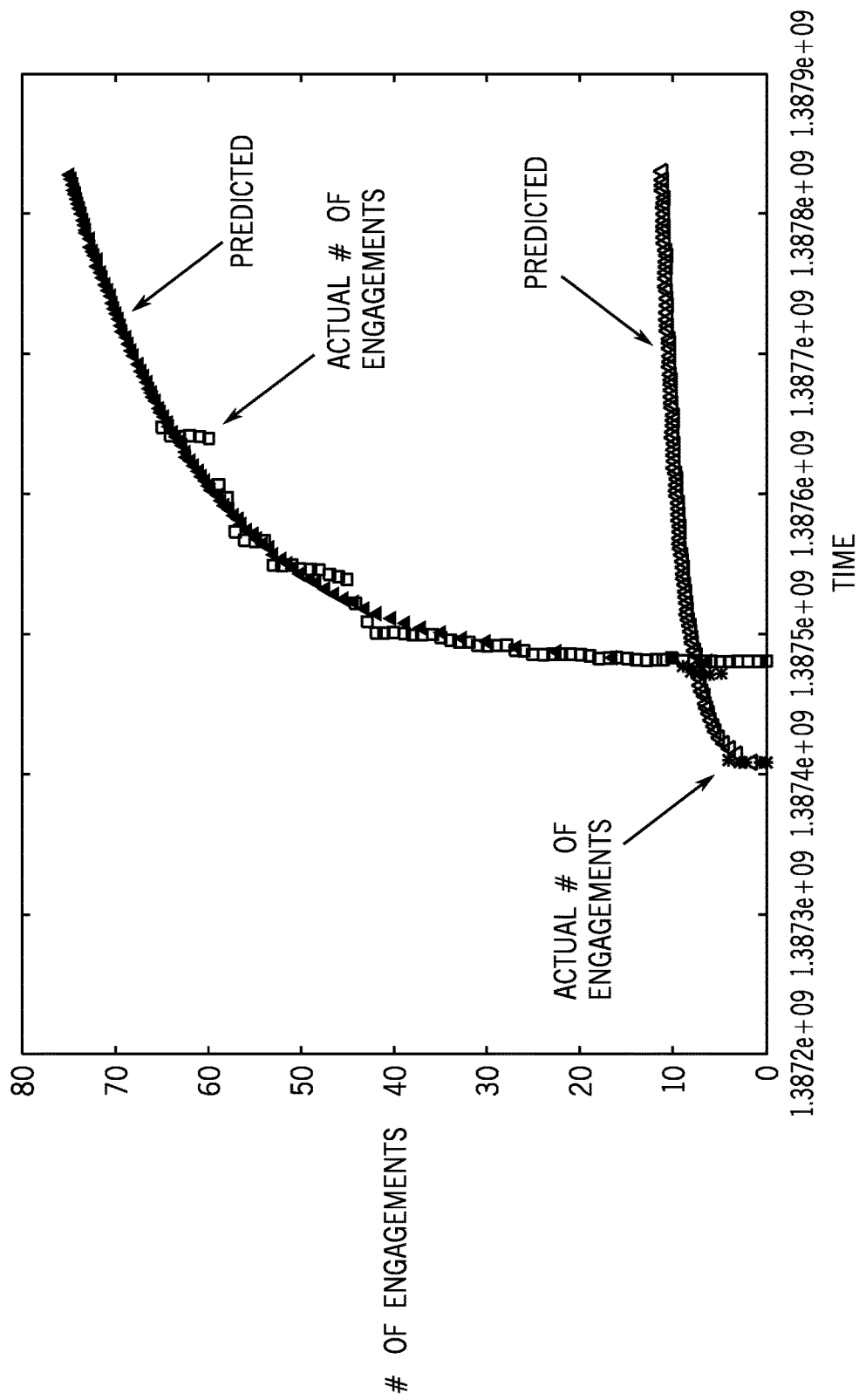
FIG. 6 depicts an example graph of the number of actual and forecasted social interactions regarding the URL in function of time.

Reference is made to FIG. 6 wherein an example is shown of a measured number of actual social network engagement (i.e., interactions by a user's audience) and a predicted number of social interactions based on logarithmic function curve fit (trend corresponds to the slope of curves).

Audience Seen Likelihood: if optimization for the user's audience reactions is desired, then the number of times an article has already been shared can also be used to estimate what percentage of the user's audience may have already seen the article. Features (discussed below) are generated to represent this likelihood, and articles with higher seen likelihood values are suppressed compared to the others. This is almost an inverse measure to the feature for rewarding trending articles, and either feature may have a different weight depending on the objective for optimization.

Topics and keywords of users sharing articles: since topics and keywords are derived for users on social media, topic and keyword strengths can be identified for an article based on the topics and keywords of the users who shared the article on social media. These topic and strengths can then be later used as features to improve assignment of topics and keywords to articles, thereby improving topical relevancy while surfacing them to new users.

Thus, the data or properties described above with respect to scoring (e.g., features for topic and keyword relevance, diversity, timeliness and social signals) are all used in feature generation below.

Returning to FIG. 3, execution then proceeds to steps 312 and 316 simultaneously. Specifically, the URL summarization documents are indexed at step 314 and stored in index database 222. At the same time, the URL summarization documents are stored in URL summarization database 220 at step 316. Then, execution proceeds to step 318 wherein URL data is retrieved from the summarization documents stored in database 220. At this point, RSS feeds are discovered and collected as follows.

Execution then proceeds to step 320 wherein the RSS feeds are extracted from the metal data within the URL summarization documents. Next, at step 322 the user data for each RSS feed is aggregated as follows:

RSS=({user}, {actor}, {action}, {author}, {publisher}, {# of URLs})

where the user is the author of post, the actor is a person that engaged, action is the user action (e.g., like, favorite, tweeted, comments, share), author is the author of the post, publisher is site where URL was published, and # of URLs is the number of URLs.

Execution then proceeds step 324 wherein the social importance score of each RSS feed is computed as a function of a Klout score and aggregated data. This computation is similar to the URL scoring above except that now additional information from the URL summarization document is used. The social importance score ($F^{RSS}$ (rss)) is computed as follows:

$$F^{RSS}(rss) = \sum_{i'|t \in T, d^{url}.rss} w(e)*(\alpha*g(k^u) + \beta*g(k^a) + \gamma*g(k^{d^{url}.p}) + \delta*g(k^{d^{url}.c}))$$

where the parameters identified above are defined as follows:
  Interaction tuple with document summarization: i'=(t, url, u, $k^u$, a, $k^a$, e, $d^{url}$)
  URL document summarization: $d^{url}$=(rss, p, $k^p$, c, $k^c$).
  rss: RSS source extracted from HTML metadata of URL. This is an RSS in which a URL occurs.
  p: publisher/site where URL was published (e.g., @cnn for cnn.com).
  $k^p$: Klout information of the publisher.
  c: creator/author of the URL (e.g., @TimListerCNN journalist that authored an article on cnn.com).
  $k^c$: Klout information of the creator/author.
  T=[$t_{start}$, $t_{end}$]: Time window in which we score given url.
  α: original user importance weight (scalar).
  β: actor importance weight (scalar).
  w: event weighting function to allow us to weight different events differently (Twitter comment vs. Facebook comment etc.).
  g: user weighting function. Given users info, and in particular Klout info derive weight of given user.
  γ: publisher/site importance weight (scalar).
  β: creator/author importance weight.
  An example of one possible simplified formula can be the following:

$$F^{RSS}(rss) = \sum_{i'|t \in T, d^{url}.rss} (0.1*k^a.score + 0.2*k^u.score + 0.3*k^{d^{url}.p}.score + 0.4*k^{d^{url}.c}.score)$$

where k·score is the Klout score for the user. Similar to the URL scoring function above, a Klout score may be replaced with another weight value (e.g., 1, where all users have the same influence) as known to those skilled in the art.

Execution then proceeds to step 326 wherein the RSS feeds are ranked by the social importance scores. Execution then proceeds to step 328 wherein the actual URL inside the RSS feeds are fetched (collected). Execution then proceeds to steps 330 and 312 wherein a summarization document for each URL within the RSS feeds is generated (stored) and indexed at step 314. The summarization documents are also stored in index database 222.

Figure 4:
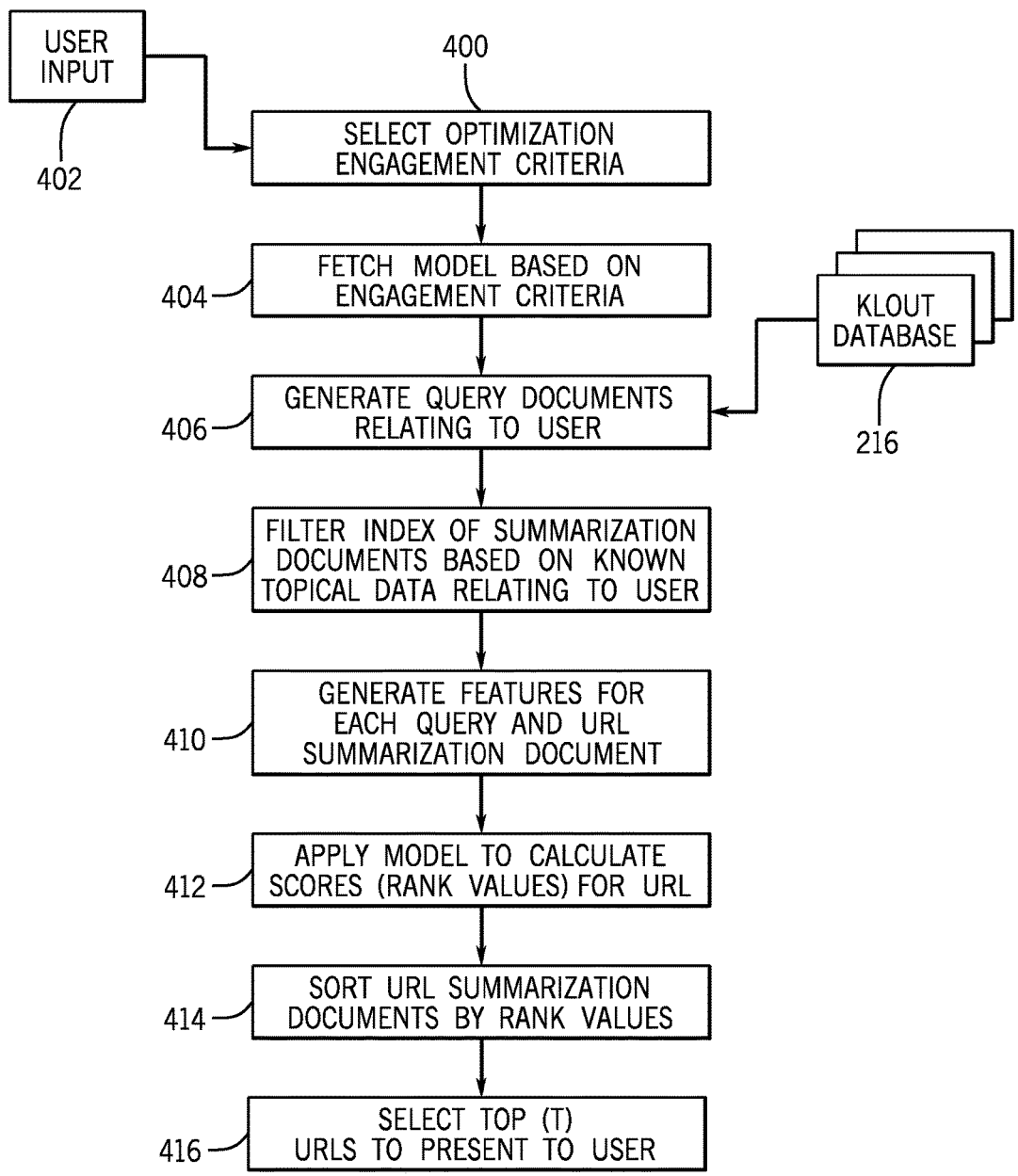
FIG. 4 depicts example method steps for implementing the feature generation, model selection and serving modules shown in FIG. 2.

FIG. 4 depicts example method steps for implementing the feature generation, model selection and serving modules shown in FIG. 2.

In particular, execution begins step 400 wherein optimization engagement criteria is selected based on a user input data 402. That is, it is the collected data that has been previously inputted by the user. The user input data the location where the user resides, age, user selected topics, etc.

Execution then moves to step 404 wherein a pre-created model (discussed below) is selected based on the engagement criteria. The model criteria is defined by the type of interaction (e.g., like, click, shares, views etc.). In this respect, scoring of the URL summarization documents may change depending on the model selected. That is, the framework for model creation and selection is independent from data collection and URL scoring (described below).

Figure 7:
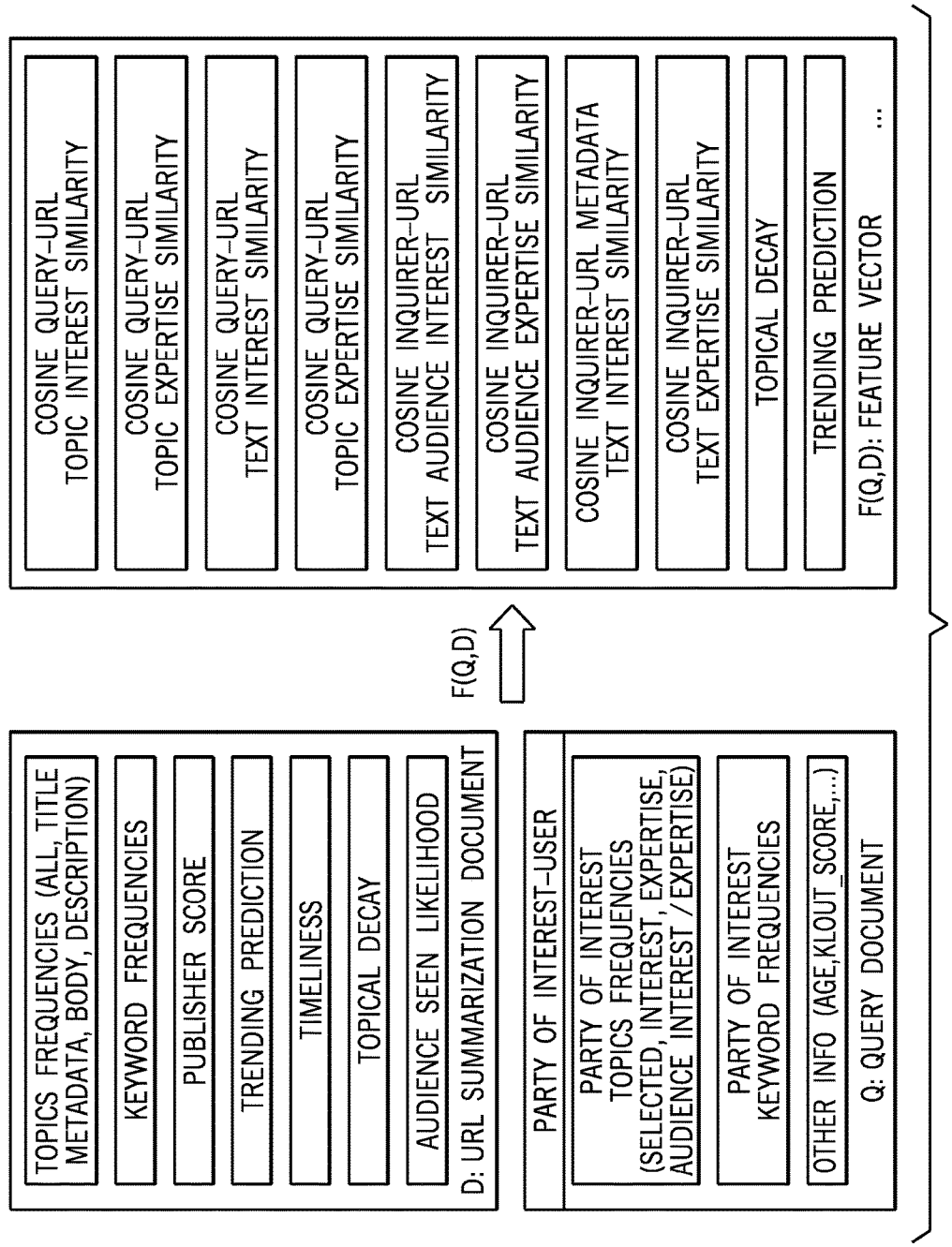
FIG. 7 depicts an example block diagram illustrating how the features are created.

Once the particular model is selected, execution proceeds to step 406 wherein (complex) query documents are generated about the user (e.g., user information, current timestamp). The query document, in addition to topic(s) that a user initiated requested, captures any additional information with respect to the user, which can be used to create better personalization experience. In this context, personalization refers to optimization per criteria selected with respect to the user. For example, if @Nike accesses the topical page on "Big Data," knowing that @Nike's audience is interested in "Running," and "Health," articles might be prioritized that are about "Big Data" but related to "Running" and "Health." The query document will identify the user (i.e., party of interest in FIG. 7), the user's topics' frequencies (selected, interest, expertise, and audience interest/expertise), user's keyword frequencies and other information such as age, user's location, Klout score of the user etc. A query document appears in FIG. 7 depicting these identifications. A specific example query document appears in the rear of this disclosure.

Execution proceeds to step 408 wherein the summarization documents stored in the index are filtered based on known topical data and derived properties relating to the user. The derived properties will include the relevant scoring described above with respect to creating URL summarization documents. For example, if the user is Nike (representative), the data already collected and known about the company may include sports information relating to running, football and other sports. The index typically includes over 1 million URL summarization documents. Initial filtering is performed to reduce that amount to a reasonable number. In practice, 50,000 URL summarization documents are considered manageable but those skilled in the art know that any number of URL summarization documents may result from the filtering process as desired.

Execution proceeds to step 410 wherein features are generated for each query document and summarization document. Reference is made to FIG. 7 wherein an example block diagram is depicted illustrating how the features are created. Each feature (F (Q,D)) described below) is created as a function of the data in a URL summarization document and Query document for that user. In particular, several cosine similarity calculations are performed on the vector data (e.g. weighted topic, and keywords) in a URL summarization document and the data in the query document to generate some of features contributing to feature vectors. For relevance ranking, each query if matched against filtered documents to create a unique query, the query document feature vector, is shown below:

$Q_1$: F $(Q_1,D_1)$, $F_2$ $(Q_1,D_2)$ . . .
$Q_2$: F $(Q_2,D_1)$, $F_2$ $(Q_2,D_2)$ . . .

where Q is identified as data from the query document and D is identified as data from the URL summarization document. For example, the cosine query-URL topic Interest similarity is between the vector of data variables in the URL summarization document and the vector of data variables of the query document. This will measure the similarities between the two vectors. Similar calculations are conducted for cosine query-URL topic expertise similarity, cosine query-URL text interest similarity, cosine query-URL text expertise similarity, cosine inquirer-URL text audience interest similarity, cosine inquirer-URL text audience expertise similarity, cosine inquirer-URL metadata text interest similarity, cosine inquirer-URL text expertise similarity. Some of the features are only based on the URL summarization document alone as the ones discussed above in relevant scoring. Some of these features include: topical decay, social relevance, timeliness, etc. The resulting features amount to about 50.

Execution proceeds to step 412 wherein the selected model is applied to calculate scores (rank values) for each URL summarization document. The model is used to incorporate the importance of a feature (and calculate a score based on the importance of the model). The specific weights are determined by the model selected. In practice, the weights are applied to feature vector parameters and are then summed per summarization document to obtain a score as follows:

S (Q,D)=M*F (Q,D) (i.e., linear form S=M(D))
where M is the model selected, F is the feature vector based on query document Q and URL summarization document D. For example, of a linear model, if F and M are as follows:
F (Q,D)=['TEXT: 0.5, 'RECENCY: 0.9]
M=['TEXT': 1.0; 'RECENCY: 10.0, 'SPAM': −100.0],
then
S=M*F (Q,D)=0.5*1.0+0.9*10.0+0*(−100.0)=9.5
So, the score in the example above is 9.5 for a given model M and feature vector F.

Execution proceeds to steps 414 and 416 wherein the URL summarization documents are sorted by score and the top (T) number of URL summarization documents are presented to the user. The URL summarization documents are ranked in order by score. T is set to 15, but those skilled in the art know that any number of URLs may be presented to the user.

Figure 8:
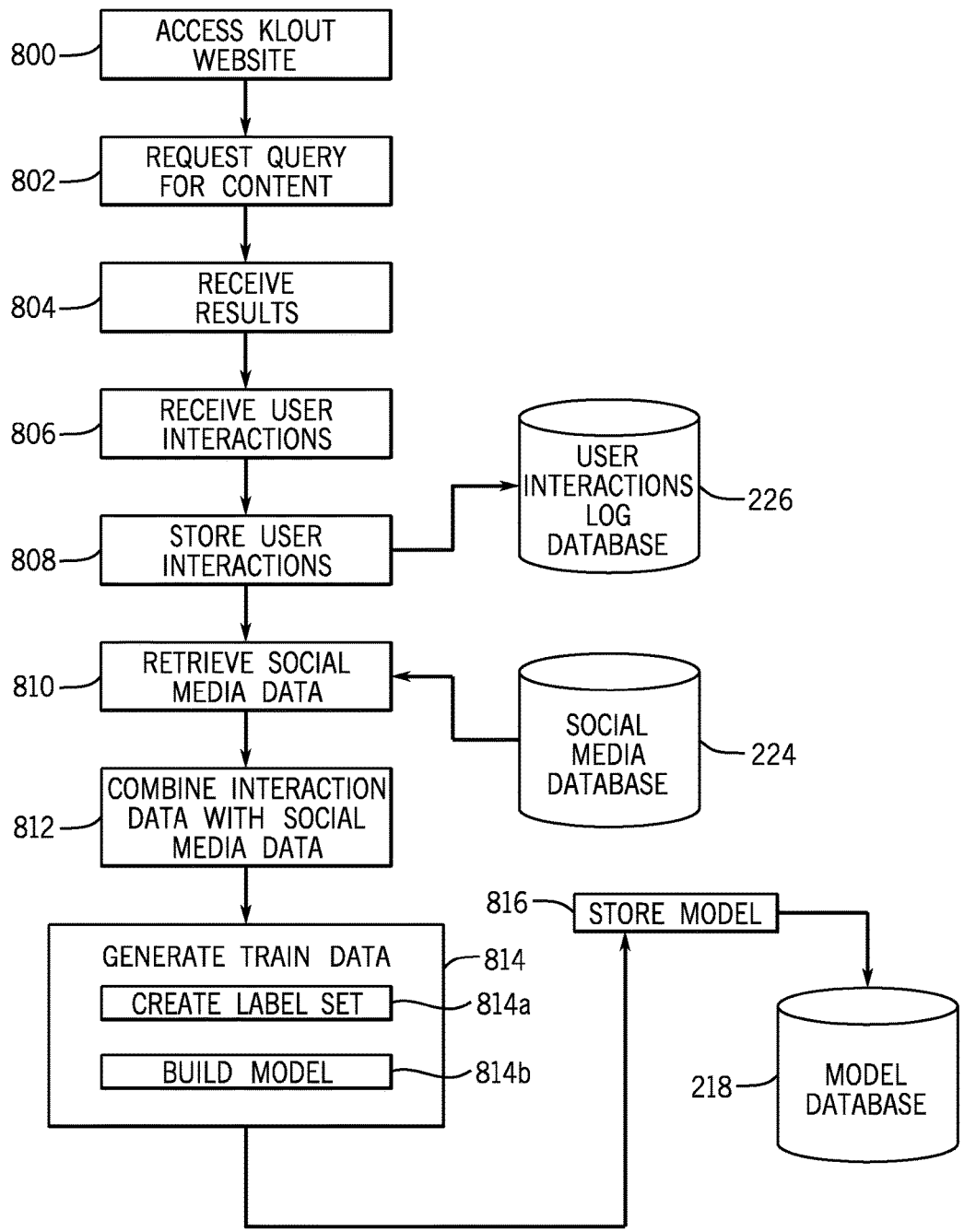
FIG. 8 depicts an example method steps for implementing how models are created.

As described above, the specific weights are determined by the model selected. FIG. 8 depicts an example method steps for implementing how models are created. Execution begins at step 800 wherein a user will access the Klout.com website (Klout.com). For example, the user could be corporate representative (e.g., Nike), government representative, an independent person or any other person as described above. At this point, the user requests a query for relevant URLs for topics at step 802. A query document is created as described above by the request. The execution proceeds to step 804 wherein the user will receive the results using content discovery platform 200 described above. The results will include a list of URLs ranked in order of score as described above.

Execution proceeds to step 806 wherein user interactions are received. These interactions include social network user reactions such likes, clicks, shares and views of a URL. At step 808, these other users' data is stored in user interaction log database 226 in the format as follows:

{Q, D, I} where Q is the user query document triggered by the user request, D is the URL summarization document described above and I is the interaction is the reaction type captured as represented in the following examples:

Example 1 I={click: [$D_1$, $D_2$, $D_3$], share: [$D_1$]}
Example 2 I={share: [$D_{10}$]}

The data is stored to enable the user (requesting the query) to search the database for specific information as desired.

Execution then proceeds to step 810 wherein social media data from social networks 104 is retrieved from social network media database 224 (that was collected by collectors from database 214). The social media data includes a user's postings, and other user's interactions etc.

Execution then proceeds to step 812 wherein the interaction data and social network data are combined as follows:

Combined data={Q, D, I, optionally SE}
where SE is a social engagement optionally retrieved outside of Klout.com (social media data) and Q, D and I are as identified above.

Execution proceeds to step 814 wherein the resulting train data is generated based on the combined data. That is, a label set is created at sub-step 814a and the model is built at sub-step 814b. The label is created for each feature vector. Each unique pair (Q,D) within label set has unique label $L_{(Q,D)}$ assigned for it. This is represented as a label feature vector tuple:

$(L_{(Q,D)}, F(Q, D))$ where L is the label set assigned for a feature for the following optimization criteria:

{$L_1$: clicks}
{$L_2$: shares}
{$L_3$: views}
{$L_3$: social network engagements outside of Klout} where the social network engagements are retrieved from a Klout.com account of the user. $L_3$ is an optimization for the audience (of user engagements/interactions), not of the user requesting a query. For example, $L_{3\ (Q,D)}$, captures how many social network (re-tweets, favors, Facebook likes) interactions in total occurred when @Nike shared a URL whose summarized form is D.

Execution then proceeds to step 814 wherein a model is built to fit the label set. It is the weight of the label sets that are used for calculating scores for the URLs as described in FIG. 4. There is a weight for each feature within feature vector. Different label sets refer to different optimization criteria. Machine learning is used to generate desired engagement outcome. Different optimization criteria are designed for different cohort of users. For example, a cohort may be broken down into three categories: the casual user (e.g., those that click only); mid-level users (e.g., those that share articles); and large audience (big brands desire a large audience engagements). Each cohort will likely use a different model. The models built are stored in model database 218 for subsequent use by content discovery platform 200.

For a given user, different topical source sets of topics are kept that relate to the user in different ways (some sets are expertise, interested—based on user behavior, user audience interest or topics that the user simply marked as interested.). Either a user (e.g., Nike) or administrator of content discovery platform 200 may select the cohort through a cohort controller. Based on the cohort, a model controller will determine the model to be applied. The administrator can experiment to see how different models perform and create new models based on outcomes. Data is served to a user by model ID (identification) and the user's actions are logged together with the model ID so that later, based on the user's actions, different metrics may be derived to measure different metrics (model performance).

It is noted the embodiment of in this disclosure incorporate several the software modules and several steps to implement the software modules. However, those skilled in the art know that additional or lesser number of software modules or steps may be employed or the order of steps may be altered to achieve desired results. In addition, the databases disclosed may be any data store (storage) as known to those skilled in the art know may be used to achieved desired results.

Figure 9:
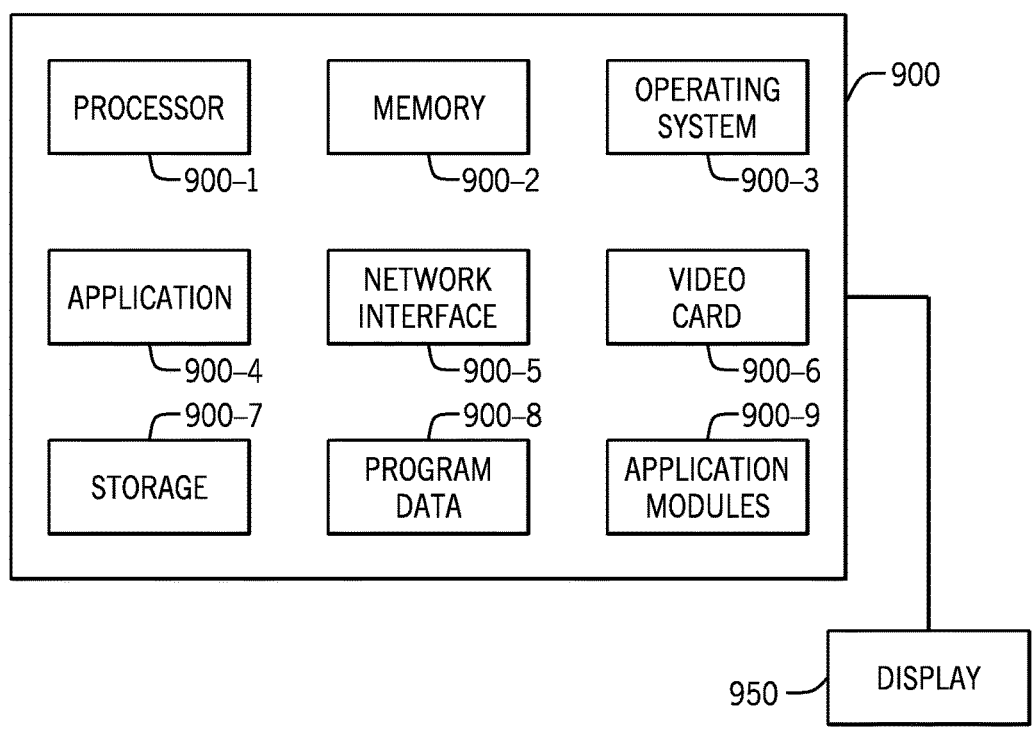
FIG. 9 depicts a general-purpose computer to support the embodiments of the computer-implemented systems and methods including computer components disclosed in this application.

FIG. 9 depicts a block diagram of a general-purpose computer to support the embodiments of the systems and methods disclosed herein. In a particular configuration, the computer 900 may be a server or a computer (client) as described above. The computer 900 typically includes at least one processor 900-1 and system memory 900-2 (e.g., volatile—RAM or non-volatile—Flash or ROM). System memory 900-2 may include computer readable media that is accessible to the processor 900-1. The memory 900-2 may also include instructions for processor 900-1, an operating system 900-3 and one or more application platforms 900-4 such as Java and a part of software modules or one or more software applications (i.e., steps) and/or modules 900-9. The computer will include one or more communication connections such as network interfaces 900-5 to enable the computer to communication with other computers over a network, storage 900-7 such as a hard drives for storing data 900-8 and other software described above, video cards 900-6 and other conventional components known to those skilled in the art. This computer 900 typically runs Unix or Linux or Microsoft Windows or Macintosh OSX or other as the operating system and includes the TCP/IP protocol stack (to communicate) for communication over the Internet as known to those skilled in the art. A display 950 is optionally used. The server typically includes TCP/IP protocol stack (to communicate) for communication over the Internet as known to those skilled in the art. Program Data 900-8 is also stored within computer server 900. The content providers also include a web server along with other servers hosted by the content provider as known by those skilled in the art. The content providers also include a web server along with other servers hosted by the content provider as known by those skilled in the art.

It is to be understood that the disclosure teaches examples of the illustrative embodiments and that many variations of the invention can easily be devised by those skilled in the art after reading this disclosure and that the scope of the present invention is to be determined by the claim(s) below.

Example URL Summarization Document

---

{
    "url_id": "ebe3497132bba7a91c6e",
    "action_url": "http://www.independent.co.uk/arts-entertainment/films/news/harry-potter-studio-tour-accused-of-cruelty-over-use-of-owls-in-live-shows-10127081.html",
       "content_type": "ARTICLE",
       "title": "Harry Potter tour accused of cruelty for use of live 'Hedwigs'",
    "description": "The use of owls and other animals at Warner Bros' The Making of Harry Potter is under review following reported complaints from visitors.",
    "article": "Note: We do not store your email address(es) but your IP address will be logged to prevent abuse of this feature. Please read our Legal Terms & Policies The use of owls and other animals at Warner Bros' The Making of Harry Potter is under review following reported complaints from visitors. . . . .",
       "redirect path": [
          "http://ind.pn/1DNMHsF",
          "http://www.independent.co.uk/arts-entertainment/films/news/harry-potter-studio-tour-accused-of-cruelty-over-use-of-owls-in-live-shows-10127081.html"
    ],

```
"publication_timestamp": 1427068800000,
"processing_timestamp": 1427813470574,
"language": "en",
"origin": "HTML",
"social_networks": [
    {
        "type": "SITE",
        "network": "tw",
        "id": "16973333",
        "display_name": "Independent"
    },
    {
        "type": "SITE",
        "network": "fp",
        "id": "235586169789578"
    },
    {
        "type": "SITE",
        "network": "fb",
        "id": "235586169789578"
    }
],
"derived_properties": {
    "properties": [
        {
            "key": "IMAGE_BYTE_SIZE_QUALITY",
            "score": 0.7150435918004114
        },
        {
            "key": "IS_SUPPORTED_LANGUAGE",
            "score": 1
        },
        {
            "key": "PUBLICATION_TIMESTAMP",
            "score": 1427068800000
        },
        {
            "key": "PUBLISHER_SHARE_RANK",
            "score": 301
        },
        {
            "key": "DALE_CHALL_READABILITY",
            "score": 7.625561154855643
        },
        {
            "key": "DESCRIPTION_LENGTH_QUALITY",
            "score": 0.6665045699751606
        },
        {
            "key": "PUBLISHER_VOTE_UP_RANK",
            "score": 229
        },
        {
            "key": "IMAGE_QUALITY",
            "score": 0.9760999054720537
        },
        {
            "key": "DESCRIPTION_LENGTH",
            "score": 137
        },
        {
            "key": "IMAGE_QUALITY_HEIGHT",
            "score": 0.9760999054720537
        },
        {
            "key": "IS_ARTICLE",
            "score": 1
        },
        {
            "key": "PROCESSING_TIMESTAMP",
            "score": 1427813470574
        },
        {
            "key": "FLESCH_KINCAID_READABILITY",
            "score": 44.04497047244098
        },
        {
            "key": "IS_VALID_SUMMARY",
            "score": 1
```

```
        }
    ],
    "topics": [
        {
            "key": "8552043618112380303",
            "score": 1.4333,
            "compact_sources": "A:0.67,D:1,T:1"
        },
        {
            "key": "6801048181576997254",
            "score": 0.8,
            "compact_sources": "A:1,D:1"
        },
        {
            "key": "2092",
            "score": 0.7333,
            "compact_sources": "A:0.67,D:1"
        },
        {
            "key": "6255341803065403696",
            "score": 0.1333,
            "compact_sources": "A:0.67"
        },
        {
            "key": "10000000000000000040",
            "score": 0.0667,
            "compact_sources": "A:0.33"
        }
    ],
    "keywords": [
        {
            "key": "harry",
            "score": 1.4333,
            "compact_sources": "A:0.67,D:1,T:1"
        },
        {
            "key": "harry potter",
            "score": 1.4333,
            "compact_sources": "A:0.67,D:1,T:1"
        },
        {
            "key": "potter",
            "score": 1.4333,
            "compact_sources": "A:0.67,D:1,T:1"
        },
        {
            "key": "animals",
            "score": 0.8,
            "compact_sources": "A:1,D:1"
        },
        {
            "key": "owls",
            "score": 0.8,
            "compact_sources": "A:1,D:1"
        },
        {
            "key": "tour",
            "score": 0.7667,
            "compact_sources": "A:0.33,T:1"
        },
        {
            "key": "review",
            "score": 0.7333,
            "compact_sources": "A:0.67,D:1"
        },
        {
            "key": "warner",
            "score": 0.7333,
            "compact_sources": "A:0.67,D:1"
        },
        {
            "key": "accused",
            "score": 0.7,
            "compact_sources": "T:1"
        },
        {
            "key": "cruelty",
            "score": 0.7,
            "compact_sources": "T:1"
```

```
        },
        {
            "key": "live",
            "score": 0.7,
            "compact_sources": "T:1"
        },
        {
            "key": "complaints",
            "score": 0.6667,
            "compact_sources": "A:0.33,D:1"
        }
        ],
        "language": "en"
    },
    "media": {
        "display_images": {
            "small_image_url":
"http://www.independent.co.uk/incoming/article10127100.ece/alternates/w620/peta-
owls-harry-potter.jpg",
            "medium_image_url":
"http://www.independent.co.uk/incoming/article10127100.ece/alternates/w620/peta-
owls-harry-potter.jpg",
            "large_image_url":
"http://www.independent.co.uk/incoming/article10127100.ece/alternates/w620/peta-
owls-harry-potter.jpg"
        },
        "images": [
            {
                "image_url":
"http://www.independent.co.uk/incoming/article10127100.ece/alternates/w620/peta-
owls-harry-potter.jpg",
                "image_height": "465",
                "image_byte_size": 41905
            }
        ]
    },
    "image_url":
"http://www.independent.co.uk/incoming/article10127100.ece/alternates/w620/peta-
owls-harry-potter.jpg"
}
```

Example Query Document

```
{
    "model_serialized_id": "LINEARK_GT_20_EXPERIMENT_64",
    "model_serialized_str": "US-KEYWORD_ASSIGNMENT-COSINE:1.0,US-
TOPIC_ASSIGNMENT-COSINE:1.0,S-IMAGE_QUALITY:0.5,US-
LANGUAGE_MATCHED:0.6,S-PUBLICATION_TIME_DECAY_SCORE:0.6,S-
DESCRIPTION_LENGTH_QUALITY:0.3,S-PUBLISHER_SHARE_SCORE:0.5,S-
PUBLISHER_VOTE_UP_SCORE:0.5,S-TOPIC_DECAY_SCORE:0.5",
    "user_interest_keywords": "books:0.666, harry
potter:0.666,magic:0.777,fiction:0.0342,gremlins:0.0342,sonic robots:0.0342,",
    "user_interest_topics":
"8325116929769409650:0.98,6011700363202204797:0.95,7161145261372296852:0.9
1",
    "user_audience_interest_keywords": "fiction:0.5,books:0.3,tv series:0.2,trone:0.1,",
    "user_audience_interest_topics":
"6011700363202204797:0.50,884690485632022047:0.94,5261372296852716114:0.93
46643712656979,3399661451037225108:0.09,5005199181163529246:0.01",
    "user_info": "city:San
Francisco,state:California,country:US,age:31,gender:m,language:en&de",
    "user_klout_id": "52",
    "timestamp": "1411577847555"
}
```

We claim:

1. A method of providing a content discovery platform for optimizing a number of social network engagements from an audience of a first user on one or more social networks, the method is implemented in one or more servers programmed to execute the method, the method comprising:

retrieving social media data from users on the one or more social networks, wherein the social media data includes one or more URLs associated with one or more articles, respectively;

aggregating the social media data for each URL by a number of users, actors and actions with respect to each URL;

computing a social importance score for each URL of the one or more URLs as a function of the aggregated data associated with that URL so as to estimate engagement of an article associated with a URL on the one or more social networks;

ranking the one or more URLs by social importance score;

generating a summarization document for each URL of the one or more URLs, wherein a summarization document for each URL includes information extracted from a web page of the article that is associated with the URL and information derived from the extracted information;

indexing the summarization documents relative to social importance score;

selecting criteria for optimizing the number of engagements of the audience of the first user based on input data from the first user;

fetching a model for optimizing the number of engagements from the audience of the first user on the one or more social networks based on the criteria selected;

generating query documents with information relating to the first user;

generating features as a function of data in each query document and summarization document; and applying the selected model to the features to calculate scores for each URL summarization document; and selecting one or more summarization documents to present to the first user as a function of the calculated scores for the summarization documents, wherein the presentation of summarization documents thereby enables the first user to subsequently select one or more URLs from the summarization documents for posting on the one or more social networks to receive an optimal number of social network engagements from the audience of the first user.

2. The method of claim 1 further comprising filtering the indexing of the summarization documents as a function of the information relating to the first user.

3. The method of claim 1 wherein the input data includes location, residence and/or topics of interest of the first user.

4. The method of claim 1 wherein the information relating to the first user in the query documents includes identification, topics of interest frequencies, keyword frequencies, age, location and/or Klout score of the first user.

5. The method of claim 1 further comprising sorting summarization documents by the calculated scores.

6. The method of claim 1 further comprising extracting one or more RSS feeds from URLs derived from the social media data.

7. The method of claim 6 further comprising computing a social importance score for each RSS feed.

8. The method of claim 7 further comprising ranking the one or more RSS feeds by social importance scores.

9. The method of claim 8 further comprising fetching URLs from the one or more RSS feeds.

10. The method of claim 9 further comprising generating summarization documents for each URL within an RSS feed.

11. The method of claim 7 wherein the social importance score is a function of an RSS feed and/or a Klout score of a user that shares a URL having RSS feed.

12. The method of claim 1 wherein generating the summarization document for each URL include analyzing each article associated with the URL to extract keywords and/or topics and assigning a score that represents how closely each article relates to a keyword and/or topic.

13. The method of claim 12 wherein generating the summarization document for each URL further includes applying keywords and/or topics:

as a function of an interest or expertise of the first user;
as a function of the first user's audience;
that are selected by the first user; or
as a function of trending keywords and topics; and
assigning a score that represents how closely the article relates to a keyword and/or topic.

14. The method of claim 1 wherein the criteria is selected as a function of the type of engagement desired from the audience of the first user.

15. The method of claim 1 wherein generating a summarization document for each URL includes:

capturing the timeliness of each article associated with the URL based on its publication by a publisher; and
capturing a frequency of publication of each article.

16. The method of claim 15 wherein the capturing the timeliness is based on a topical decay factor of the article.

17. The method of claim 13 wherein each article of the one or more articles associated with the one or more URLs are scored based on (1) keyword and/or topic frequency, (2) publisher rank for each article, (3) timeliness and/or frequency of the article and/or (4) predicted trend of sharing of the article.

18. A computer-implemented system for providing a content discovery platform for optimizing social network engagements from an audience of a first user on one or more social networks, the system comprising:

a data storage area to store:
a social media database, wherein social media data pertaining to data on social networks associated with users is stored in the social media database;
one or more processors coupled to the data storage area and memory in communication with the one or more processors, the memory including program instructions that, when executed by the one or more processors, cause the one or more processors to:
discover one or more URLs from the social media data stored in the social media database, wherein the one or more URLs are associated with one or more articles;
aggregate the social media data for each URL by a number of users, actors and actions with respect to each URL;
compute a social importance score for each URL of the one or more URLs as a function of the aggregated data, so as to estimate engagement of an article associated with a URL on the one or more social networks;
rank the one or more URLs by social importance score;
select criteria for optimizing the number of engagements of the audience of the first user based on input data from the first user;
select a model for optimizing the number of engagements from the audience of the first user on the one or more social networks based on the criteria selected;
generate a summarization document summarizing each article of the one or more articles associated with the one or more URLs, wherein the summarization document includes one or more scores relating to relevancy of one or more aspects of the one or more articles, respectively;
index the summarization documents relative to social importance score;
generate a query document relating to the first user, wherein the query document includes topic frequencies and/or keyword frequencies in the one or more articles;
generate a plurality of features as a function of the query document and summarization document to determine relevancy of the one or more articles to the first user; and apply the selected model to the features to calculate scores for each URL summarization document; and select one or more summarization documents to present to the first user as a function of the calculated scores for the summarization documents, wherein the presentation of summarization documents thereby enables the first user to subsequently select one or more URLs from the summarization documents for posting on the one or more social networks to receive an optimal number of social network engagements from the audience of the first user.

* * * * *